United States Patent
Saito et al.

(10) Patent No.: US 7,789,944 B2
(45) Date of Patent: Sep. 7, 2010

(54) SYSTEM AND METHOD FOR TREATING DUST CONTAINED IN EXTRACTED CEMENT KILN COMBUSTION GAS

(75) Inventors: Shinichiro Saito, Kumagaya (JP); Soichiro Okamura, Fukaya (JP); Tsuyoshi Matsura, Kumagaya (JP)

(73) Assignee: Taiheiyo Cement Corporation (JP)

( * ) Notice: Subject to any disclaimer, the term of this patent is extended or adjusted under 35 U.S.C. 154(b) by 785 days.

(21) Appl. No.: 11/663,673

(22) PCT Filed: Sep. 20, 2005

(86) PCT No.: PCT/JP2005/017259

§ 371 (c)(1),
(2), (4) Date: Mar. 22, 2007

(87) PCT Pub. No.: WO2006/035631

PCT Pub. Date: Apr. 6, 2006

(65) Prior Publication Data

US 2008/0092739 A1    Apr. 24, 2008

(30) Foreign Application Priority Data

Sep. 29, 2004    (JP) ............................. 2004-283397

(51) Int. Cl.
*B01D 53/14*    (2006.01)
(52) U.S. Cl. .............................. 95/228; 95/197; 95/205; 95/219; 95/234; 95/235; 96/234; 96/236; 96/237; 96/238; 96/366; 423/242.1; 423/243.1; 210/703; 210/704; 209/162

(58) Field of Classification Search .......... 95/195–197, 95/205, 219, 235, 288, 288.228; 96/234, 96/301, 236–238, 366; 423/242.1, 243.1; 210/703–704; 209/162

See application file for complete search history.

(56) References Cited

U.S. PATENT DOCUMENTS 4,456,485 A * 6/1984 Iyengar et al. .............. 106/408
(Continued)

FOREIGN PATENT DOCUMENTS

JP    6-157089 A    6/1994
(Continued)

*Primary Examiner*—Duane Smith
*Assistant Examiner*—Ives Wu
(74) *Attorney, Agent, or Firm*—Stetina Brunda Garred & Brucker

(57) ABSTRACT

A treatment system to efficiently remove lead from dust contained in extracted cement kiln combustion gas while reducing facility and running costs. A treatment system 1 comprising: a probe 3 for extracting a part of combustion gas, while cooling it, from a kiln exhaust gas passage, which runs from an inlet end of a cement kiln to a bottom cyclone; a classifier 5 for separating coarse powder from dust contained in the combustion gas extracted by the probe 3; a wet dust collector 6 for collecting dust from the extracted gas containing fine powder discharged from the classifier 5; and devices 12, 13 for feeding sulfurizing agent for sulfurizing lead contained in the kiln exhaust gas to the wet dust collector 6, and others. From the sulfurizing-agent feeders 12, 13 are preferably added the sulfurizing agents to a circulation liquid tank 7 or a pump 9 for circulating slurry. The slurry obtained by the wet dust collector 6 is separated into froth including lead and tail side slurry including gypsum by a flotation facility 14, 17, 18.

6 Claims, 1 Drawing Sheet

U.S. PATENT DOCUMENTS

| | | | | |
|---|---|---|---|---|
| 4,716,027 | A | * | 12/1987 | Morrison .................. 423/225 |
| 4,744,890 | A | * | 5/1988 | Miller et al. ................ 209/164 |
| 5,413,725 | A | * | 5/1995 | Lal et al. .................... 508/235 |
| 5,772,776 | A | * | 6/1998 | Holbein ........................ 134/2 |
| 2004/0195154 | A1 | * | 10/2004 | Oravainen et al. .......... 209/169 |

FOREIGN PATENT DOCUMENTS

| | | | | |
|---|---|---|---|---|
| JP | 11-010131 | | * | 1/1999 |
| JP | 11-010131 | A | | 1/1999 |
| JP | WO-2004052801 | | * | 6/2004 |
| JP | EP-1574487 | A1 | * | 9/2005 |
| WO | WO 2004/052801 | A1 | | 6/2004 |
| WO | WO 2004052801 | | * | 6/2004 |

* cited by examiner

US 7,789,944 B2

SYSTEM AND METHOD FOR TREATING DUST CONTAINED IN EXTRACTED CEMENT KILN COMBUSTION GAS

CROSS-REFERENCE TO RELATED APPLICATIONS

The present application claims priority to International Application No. PCT/JP2005/017259 which was filed on Sep. 20, 2005 and which claims priority to Japanese Patent Application No. 2004-283397 filed Sep. 29, 2004.

STATEMENT RE: FEDERALLY SPONSORED RESEARCH/DEVELOPMENT

Not Applicable

BACKGROUND OF THE INVENTION

1. Technical Field

The present invention relates to a system and a method for treating dust contained in extracted cement kiln combustion gas, and more particularly to a method for removing chlorine, sulfur-containing compounds and the like from a part of combustion gas extracted from a kiln exhaust gas passage, which runs from an inlet end of a cement kiln to a bottom cyclone, and efficiently removing lead from dust included in the extracted combustion gas.

2. Background Art

It is noticed that chlorine, sulfur, alkali and the like cause troubles such as preheater clogging in cement manufacturing facilities, and especially chlorine has the most harmful effect, so that cement kiln chlorine bypass systems are used in order to remove chlorine by extracting a part of combustion gas from a kiln exhaust gas passage, which runs from an inlet end of a cement kiln to a bottom cyclone.

In this chlorine-sulfur bypass system, more chlorine is distributed on fine powder side of the dust, which is generated by cooling the extracted exhaust gas, so that the dust is separated into coarse powder and fine powder by a classifier, the coarse powder is returned to a cement kiln system, and the fine powder (chlorine bypass dust) containing separated potassium chloride and the like are recovered, and are added to a cement grinding mill system (as exemplarily described in the first patent document).

However, in recent years, recycling of waste through conversion to cement raw material or fuel has been promoted, which increases the quantity of harmful lead brought to cement kilns as the quantity of the treated waste increases. As a result, lead concentration in cement may exceed a management standard.

To remove heavy metal such as lead from chlorine bypass dust or the like, in the past, for example, a technique is described in the second patent document. The technique comprises the steps of: adding water to dust contained in kiln combustion gas; utilizing solid material deposited in the first slurry for a cement raw material and the like after adjusting the pH thereof to 12, which is optimum for depositing Cd in the dust; adding carbon dioxide to the first slurry to generate the second slurry of which pH is 9, which is optimum for depositing lead; and utilizing solid material deposited in the second slurry for a cement raw material and the like.

In addition, in order to provide a treating method for effectively recovering lead and the like included in waste material, a method is described in the third patent document. The method comprises the steps of: adding sulfuric acid, hydrochloric acid, nitric acid or carbon dioxide to filtrate, which is generated after washing waste material, including heavy metals so as to deposit the heavy metals included in the filtrate as hydroxide, sulfate or carbonate; eluting the heavy metals through alkali leaching of deposited sludge; and neutralizing or sulfurizing the filtrate to recover the heavy metals including lead in the filtrate through deposition.

Further, in order to effectively separate and remove chlorine-containing compounds and lead-containing compounds included in waste material, a method is described in the fourth patent document. The method comprises: a washing process for washing waste material; an alkaline elution process for alkaline-eluting filtered solid material; a lead removal process for dividing lead from the filtrate through deposition; a calcium removal process for dividing calcium from the filtrate from which lead is removed by depositing the calcium; and a chloride recovery process for recovering chloride by heating the filtrate to separate chloride.

In addition, in the fifth patent document, to improve heavy metal recovery efficiency while maintaining high desalting effect and controlling elution of heavy metals at the washing treatment of waste material such as dust, a method for treating waste material is described. The method controls elution of heavy-metal salt and desalts waste material while adjusting pH of water-soluble slurry (suspension with water-soluble solid) included in the waste material between 8.5 and 13 in a treatment process for desalting waste material including chlorine and heavy metals.

Meanwhile, in the sixth patent document, in order to provide a cement kiln chlorine-sulfur bypass system which can remove sulfur-containing compounds included in combustion gas extracted from cement kiln, and utilize the sulfur-containing compounds with low facility cost, a technique is described. The technique comprise the steps of: extracting a part of combustion gas from a kiln exhaust gas passage, which runs from an inlet end of a cement kiln to a bottom cyclone; separating coarse powder from dust included in the extracted gas; collecting dust of the extracted gas including fine powder with a solvent in a wet dust collector; adding collected dust slurry to a cement mill system; solid/liquid separating the collected dust slurry by the wet dust collector 3; and adding obtained desalted cake and separated salt water to the cement mill system.

Patent document 1: World Patent Publication WO97/21638 pamphlet
Patent document 2: Japanese Patent 2764508 gazette
Patent document 3: Japanese Patent Publication 2002-11429 gazette
Patent document 4: Japanese Patent Publication 2003-1218 gazette
Patent document 5: Japanese Patent Publication 2002-18394 gazette
Patent document 6: Japanese Patent Publication 2004-2143 gazette

BRIEF SUMMARY OF THE INVENTION

Figure 1:
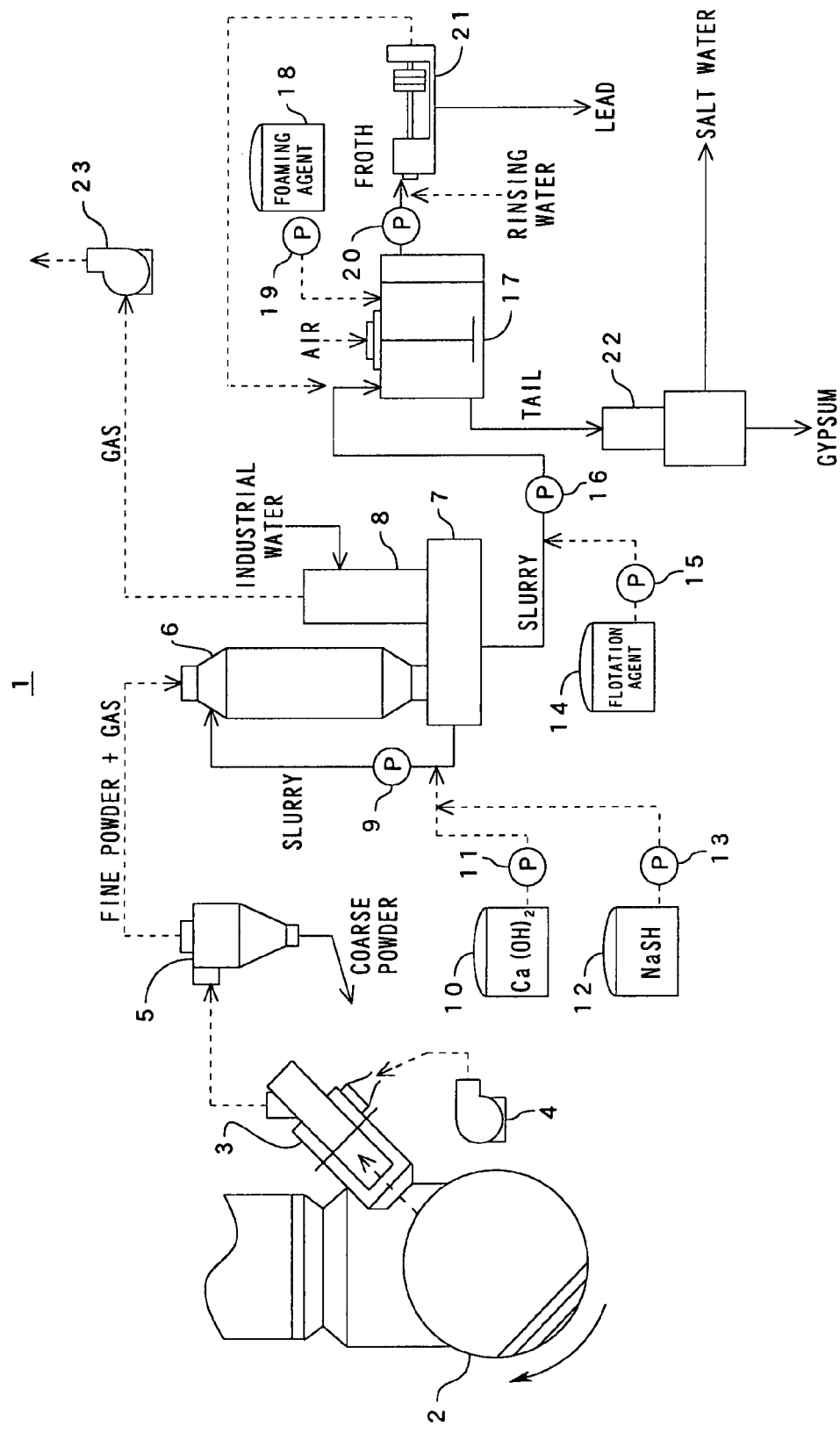
FIG. 1 is a flowchart showing an embodiment of the treatment system according to the present invention.

Problems to be Solved by the Invention

However, in the conventional methods for removing lead described above, it is necessary to install a facility for slurring dust, a depositor such as a storage tank, a washer and the like, so that facility cost rises. In addition to the operation of the above facilities, various chemicals and others should be added, which causes running cost also to rise.

The present invention has been made in consideration of the above problems in the conventional techniques, and the object thereof is to provide an apparatus and a method for efficiently removing lead from dust contained in extracted cement kiln combustion gas with low facility and running costs.

Means for Solving Problems

To achieve the above object, the present invention relates to a system for treating gas extracted from cement kiln, and the system is characterized by comprising: a probe for extracting a part of combustion gas, while cooling it, from a kiln exhaust gas passage, which runs from an inlet end of a cement kiln to a bottom cyclone; a classifier for separating coarse powder from dust contained in the combustion gas extracted by said probe; a wet dust collector for collecting dust of the extracted gas containing fine powder discharged from said classifier; and a device for feeding a sulfurizing agent for sulfurizing lead contained in the kiln exhaust gas to said wet dust collector.

With the present invention, the coarse powder of the dust included in combustion gas extracted by the probe while cooling it in the probe is separated by the classifier; collection of the dust including fine powder discharged from the classifier, desulferization of the cement kiln exhaust gas and sulfurization of lead included in the cement kiln exhaust gas are performed at the same time, so that lead can efficiently be removed from dust contained in extracted cement kiln combustion gas while keeping facility and running costs low.

The above wet dust collector may comprise: a wet scrubber; a circulation liquid tank to which slurry containing dust, which is collected by the wet scrubber, is fed; and a pump for returning a part of the slurry in the circulation liquid tank to the wet scrubber; and the sulfurizing agent can be added to one of the circulation liquid tank and the pump. In case that soda hydrosulfide (NaSH) is used as the sulfurizing agent, NaSH is susceptible to be exhausted by turning into hydrogen sulfide ($H_2S$) in the circulation liquid tanks it is, so that NaSH is preferably fed on the entrance side of the wet scrubber as near as possible.

In the system for treating gas extracted from cement kiln, a flotation facility may be installed to divide the slurry obtained by the wet dust collection into froth containing lead and tail side slurry containing gypsum. Lead can be separated, through flotation with relatively simple operation and low cost, from raw-material dust included in cement kiln exhaust gas and gypsum generated through desulfurization, which allows new washer and dewaterer not to be installed, resulting in minimized facility investment. In addition, recovered lead becomes lead sulfide (PbS), which can easily be reused, so that it becomes easy to rematerialize the recovered lead in refineries.

Further, the present invention relates to a method for treating dust contained in extracted cement kiln combustion gas, and the system is characterized by comprising the steps of: extracting a part of combustion gas, while cooling it, from a kiln exhaust gas passage from an inlet end of a cement kiln to a bottom cyclone; separating coarse powder from dust contained in the part of extracted combustion gas; and adding one of soda hydrosulfide and sodium sulfide to extracted combustion gas containing fine powder after coarse powder being separated when collecting dust of said extracted gas in wet process while desulfurizing the gas.

With the present invention, after the coarse powder of the dust included in combustion gas is extracted while being cooled, in the wet dust collector, collection of the dust including fine powder discharged from the classifier, desulferization of the cement kiln exhaust gas and sulfurization of lead included in the cement kiln exhaust gas are performed at the same time, so that lead can efficiently be removed from dust contained in extracted cement kiln combustion gas while keeping facility and running costs low.

The above method for treating dust contained in extracted cement kiln combustion gas may further comprises the step of dividing, through floatation, the slurry obtained by the wet dust collection into froth containing lead and tail side slurry containing gypsum. With this, as described above, it is possible to separate lead with low cost; minimize facility investment; and recover the lead so as to be easy for rematerialization in refineries.

In the above method, pH of the slurry in the wet dust collection process may be adjusted to 4 or more and 7 or less. With this, it is possible to prevent degradation of NaSH as little as possible; trouble caused by scale in the passage of circulating slurry that is fed to the wet scrubber can be prevented; and flotation agent, which does not function in high-pH-level environment, can certainly fulfill its function.

The method for treating dust contained in extracted cement kiln combustion gas as may further comprises the steps of, returning water separated from the froth to the flotation process and performing a step selecting from the group consisting of: adding salt water separated from the tail side slurry containing gypsum to a cement grinding process; discharging the salt water to a sewer or/and an ocean after treated; and returning water obtained after desalted in a salt recovery process to the wet dust collection process.

EFFECT OF THE INVENTION

As described above, with the system and the method for treating dust contained in extracted cement kiln combustion gas according to the present invention, it becomes possible to efficiently remove lead from dust contained in extracted cement kiln combustion gas with low facility and running costs.

DETAILED DESCRIPTION OF THE INVENTION

The Best Mode to Carry Out the Invention

FIG. 1 shows a flowchart showing an embodiment of a system for treating dust contained in extracted cement kiln combustion gas (hereinafter referred to as "treatment system" for short) according to the present invention, this treatment system 1 comprises a probe 3 for extracting a part of combustion gas from a kiln exhaust gas passage, which runs from an inlet end of a cement kiln 2 to a bottom cyclone not shown, a cyclone 5 as a classifier for separating coarse powder from dust included in combustion gas extracted by the probe 3, a wet scrubber 6 for collecting dust of the extracted gas including fine powder discharged from the cyclone 5 in wet process, a circulation liquid tank 7 for circulating collected dust slurry to the wet scrubber 6, a tank 10 for storing $Ca(OH)_2$ that is fed as desulfurizing agent to the wet scrubber 6, a tank 12 for storing NaSH that is fed to sulfide lead, a flotation machine 17 comprising a flotation facility for separating the slurry obtained by the wet dust collection into froth including lead and tail side slurry including gypsum, tanks 14 and 18 for storing flotation agent and foaming agent respectively, a filter press 21 for obtaining cake including lead sulfide by solid/ liquid separating the froth including lead from the flotation machine 17, a solid/liquid separator 22 for obtaining gypsum and salt water by solid/liquid separating slurry from the flotation machine 17, and the like.

Next, the motion of the treatment system 1 with the above-mentioned construction will be explained with reference to FIG. 1.

The gas extracted from the kiln exhaust gas passage, which runs from the inlet end of the cement kiln 2 to the bottom cyclone, is cooled in the probe 3 by cooling air from the cooling fan 4 in the probe 3, and is introduced to the cyclone 5 to be separated into coarse powder, and fine powder and gas. The separated low-chlorine-level coarse powder is returned to the cement kiln system.

The high-chlorine-level fine powder and the gas are cooled in the wet scrubber 6 with water etc. included in slurry, which is fed from the circulation liquid tank 7, and the fine powder is collected by the wet scrubber 6. Here, since in the dust slurry collected by the wet scrubber 6 exists Ca(OH)2, which is generated when CaO included in the fine powder reacts water, SO2, which exists in the extracted gas from an entrance food of the cement kiln, reacts with the above Ca(OH)2 and is desulfurized to recover gypsum as follows: $CaO+H_2O \rightarrow Ca(OH)_2$, $SO_2+Ca(OH)_2 \rightarrow CaSO_3 \cdot \frac{1}{2}H_2O + \frac{1}{2}H_2O$, $CaSO_3 \cdot \frac{1}{2}H_2O + \frac{1}{2}O_2 + \frac{3}{2}H_2O \rightarrow CaSO_4 \cdot 2H_2O$.

Here, in order to prevent trouble caused by scale in the passage of circulating slurry that is fed to the wet scrubber 6, it is required to control pH of circulating liquid in the circulation liquid tank 7 to approximately 6. When pH of the circulating liquid in the circulation liquid tank 7 becomes excessively high, as described in the patent document 6, the concentration of CaO included in the fine powder can be reduced by changing classification point of the cyclone 5 to settle the problem.

Meanwhile, removal effect of sulfur-containing compounds included in the extracted gas can be confirmed by monitoring concentration of sulfur-containing compounds included in exhaust gas. In case that the removal performance tends to lower, as described above, the quantity of absorption agent may be increased by increasing concentration of CaO included in the fine powder that is discharged from the cyclone 5, or Ca(OH)2 as an absorption agent may be fed from the tank 10 via a pump 11.

In addition, to the wet scrubber 6 is added soda hydrosulfide (NaSH) through pumps 13, 9 from the tank 12 to deposit the fine powder such as lead chloride and lead oxide included in the extracted gas as sulfide after sulfurization. Lead sulfide (PbS) is generated by the sulfurization. Here, since NaSH is separated on acid side, pH in the wet scrubber 6 needs to be adjusted to 7 or more. But, as described above, in order to prevent trouble caused by scale in the passage of the circulating slurry fed to the wet scrubber 6 and to improve recovery rate of Pb, the pH of circulating liquid in the circulation tank 7 is adjusted to be between 4 and 7.

The gas discharged from the wet scrubber 6 is released to the atmosphere via the circulation liquid tank 7, a washing tower 8 and a fan 23.

Meanwhile, slurry discharged from the circulation liquid tank 7 is fed via a pump 16 to the flotation machine 17. To the flotation machine 17 is fed flotation agent via pump 15 from the tank 14 and forming agent via a pump 19 from a tank 18. As the flotation agent, organic-chemical heavy-metal collector with xanthate group (R—O—Ca2Na), diocarbamic acid group (R—NH—CS2Na) and thiol group (—SH) and the like can be used. In this case, treatment effect of the collector deteriorates in alkaline region, but in this invention, as described above, no problem occurs since pH in the circulation liquid tank is adjusted to approximately 6. As the forming agent, MIBC (Methyl Isobutyl Carbinol) and the like may be used. To the flotation machine 17 is further fed air, and slurry is separated froth including lead and tail side slurry including gypsum through the flotation operation.

The froth including lead is fed via the pump 20 to the filter press 21 and is separated into cake including lead oxide and water. The cake including lead oxide can be recycled through rematerialization in refineries, and the separated water may be recycled in a flotation separation process by returning it to the flotation machine 17.

Meanwhile, tail side slurry including gypsum from the flotation machine 17 is solid/liquid separated in the solid/liquid separator 22 and separated salt water can be added to a cement grinding process. The separated salt water may be released to sewer or ocean after water treatment or water obtained after desaltation in a salt recovery process can be returned to the washing tower 8.

In the embodiment described above, soda hydrosulfide is used as a sulfurizing agent for lead, instead of soda hydrosulfide, sodiumsulfide (Na2S) can be used.

In addition, in the embodiment described above, the slurry discharged from the circulation liquid tank 7 is separated into the froth including lead and the tail side slurry including gypsum by the flotation operation, but on the contrary, gypsum can float as froth with flotation agent. But, in such a case, foaming agent is fed on the gypsum side, which causes much more foaming agent to be required and in case that the gypsum is added to cement mills, there is a fear that the foaming agent has harmful effect on hardening of the cement, so that the embodiment described above is more preferable.

EXPLANATION OF REFERENCE NUMBERS 1 treatment system
2 cement kiln
3 probe
4 cooling fan
5 cyclone
6 wet scrubber
7 circulation liquid tank
8 washing tower
9 pump
10 tank
11 pump
12 tank
13 pump
14 tank
15 pump
16 pump
17 flotation machine
18 tank
19 pump
20 pump
21 filter press
22 solid/liquid separator
23 fan

What is claimed is:

1. A system for treating gas extracted from cement kiln comprising:
  a probe for extracting a part of combustion gas, while cooling it, from a kiln exhaust gas passage, which runs from an inlet end of a cement kiln to a bottom cyclone;
  a classifier for separating coarse powder from dust contained in the combustion gas extracted by said probe;
  a wet dust collector for collecting dust of the extracted gas containing fine powder discharged from said classifier, said wet dust collector having a wet scrubber, a circulation liquid tank to which slurry containing dust which is collected by said wet scrubber is fed, and a pump for returning a part of said slurry in the circulation liquid tank to the wet scrubber;

a device for feeding a sulfurizing agent for sulfurizing lead contained in the kiln exhaust gas to an entrance side of said wet scrubber; and a flotation facility for separating lead from said slurry obtained by the wet dust collection.

2. The system for treating gas extracted from cement kiln as claimed in claim 1 wherein said flotation facility divides said slurry obtained by the wet dust collection into froth containing lead and tail side slurry containing gypsum.

3. A method for treating dust contained in extracted cement kiln combustion gas comprising the steps of:

extracting a part of combustion gas, while cooling it, from a kiln exhaust gas passage, which runs from an inlet end of a cement kiln to a bottom cyclone;

separating coarse powder from dust contained in said part of extracted combustion gas;

adding one of soda hydrosulfide and sodium sulfide to an entrance side of a wet scrubber while returning a part of collected dust slurry to the wet scrubber, when collecting dust of extracted combustion as containing fine powder after coarse powder being separated in wet process while desulfurizing the gas by said wet scrubber; and separating with floatation lead from said slurry obtained by the wet dust collection.

4. The method for treating dust contained in extracted cement kiln combustion gas as claimed in claim 3, further comprising the step of dividing, through said floatation, said slurry obtained by the wet dust collection into froth containing lead and tail side slurry containing gypsum.

5. The method for treating dust contained in extracted cement kiln combustion gas as claimed in claim 3 or 4, further comprising the step of adjusting pH of said slurry in the wet dust collection process to 4 or more and 7 or less.

6. The method for treating dust contained in extracted cement kiln combustion gas as claimed in claim 4 or 5 further comprising the steps of, returning water separated from the froth to the flotation process and performing a step selecting from the group consisting of: adding salt water separated from the tail side slurry containing gypsum to a cement grinding process; discharging said salt water to a sewer or/and an ocean after treated; and returning water obtained after desalted in a salt recovery process to the wet dust collection process.

* * * * *